(12) United States Patent
De Lemos et al.

(10) Patent No.: US 11,130,401 B2
(45) Date of Patent: Sep. 28, 2021

(54) HUB WHEEL FOR TANDEM AXLES

(71) Applicant: CNH Industrial America LLC, New Holland, PA (US)

(72) Inventors: José Francivaldo Pereira De Lemos, Sete Lagoas (BR); Fabio Nicora, Belo Horizonte (BR)

(73) Assignee: IVECO S.P.A., Turin (IT)

( * ) Notice: Subject to any disclaimer, the term of this patent is extended or adjusted under 35 U.S.C. 154(b) by 41 days.

(21) Appl. No.: 16/469,445

(22) PCT Filed: Dec. 12, 2017

(86) PCT No.: PCT/BR2017/050379
§ 371 (c)(1),
(2) Date: Jun. 13, 2019

(87) PCT Pub. No.: WO2018/107258
PCT Pub. Date: Jun. 21, 2018

(65) Prior Publication Data
US 2020/0039348 A1 Feb. 6, 2020

(30) Foreign Application Priority Data
Dec. 14, 2016 (BR) ...................... 10 2016 029398 7

(51) Int. Cl.
*B60K 17/04* (2006.01)
*B60K 17/16* (2006.01)
(Continued)

(52) U.S. Cl.
CPC ............ *B60K 17/046* (2013.01); *B60K 17/16* (2013.01); *B60Y 2200/142* (2013.01); *F16H 3/50* (2013.01);
(Continued)

(58) Field of Classification Search
CPC ......... B60K 17/16; B60K 17/046; F16H 3/50; F16H 2200/2007; F16H 3/62; B60Y 2200/142
(Continued)

(56) References Cited

U.S. PATENT DOCUMENTS 3,184,994 A    5/1965  Stahl
5,024,636 A    6/1991  Phebus et al.
(Continued)

FOREIGN PATENT DOCUMENTS

| DE | 1430473 A1 | 10/1968 | |
|---|---|---|---|
| DE | 10103726 A1 | 8/2002 | |
| WO | 2016/110823 A1 | 7/2016 | |
| WO | WO-2016110823 A1 * | 7/2016 | ........... B60K 17/046 |

OTHER PUBLICATIONS

International Search Report and Written Opinion for PCT application PCT/BR2017/050379, dated Jun. 18, 2019 (8 pages).

*Primary Examiner* — Toan C To
(74) *Attorney, Agent, or Firm* — Leason Ellis LLP

(57) ABSTRACT

A wheel hub for tandem axles including a housing, a reduction system, sun gears, planetary gears and a connection sleeve. The housing contains the reduction system, which is formed by the conical sun gears and the conical planetary gears that are accommodated in a supporting structure. The sun gears are mounted in a yoke that is attached to the supporting structure. The conical planetary gears are attached, respectively, to a differential housing in a fixed way and to an end of a semi-draft having free rotation. The connection sleeve is mounted in the end of the semi-draft having concentric mobility in relation to the conical planetary gear through an actuator system placed in an end of the supporting structure. The connection sleeve is (Continued)

formed by a body having a surface with double connection toothing disclosing a toothing of the yoke, and the toothing of the conical planetary gear.

11 Claims, 5 Drawing Sheets

(51) Int. Cl.
*F16H 3/50* (2006.01)
*F16H 3/62* (2006.01)

(52) U.S. Cl.
CPC ........ *F16H 3/62* (2013.01); *F16H 2200/2007* (2013.01)

(58) Field of Classification Search
USPC .......................................... 280/372; 180/372
See application file for complete search history.

(56) References Cited

U.S. PATENT DOCUMENTS

| | | | |
|---|---|---|---|
| 5,435,790 A * | 7/1995 | Kota ................... | B60K 17/346 |
| | | | 475/205 |
| 6,616,567 B2 | 9/2003 | Strong et al. | |
| 6,672,985 B2 | 1/2004 | Chung et al. | |
| 7,093,681 B2 * | 8/2006 | Strain ................... | F16D 1/112 |
| | | | 180/14.2 |
| 7,291,083 B2 * | 11/2007 | Almaguer ............. | B60K 17/36 |
| | | | 180/249 |
| 2012/0021864 A1 * | 1/2012 | Ziech .................... | F16H 48/36 |
| | | | 475/225 |
| 2013/0260961 A1 | 10/2013 | Dedo et al. | |
| 2014/0216883 A1 | 8/2014 | Boothby et al. | |
| 2017/0129331 A1 * | 5/2017 | Naitou .................. | B60T 1/062 |
| 2017/0190214 A1 * | 7/2017 | Grimminger .......... | B60B 11/02 |

* cited by examiner

HUB WHEEL FOR TANDEM AXLES

FIELD OF THE INVENTION

The present invention addresses a hub wheel for tandem axles, such as heavy vehicles for load transportation having tensile type 6×4, 8×4 or 10×4 configurations, or even those so-called tridem consisting of three tag axles.

The wheel hub, according to the present invention, comprises a set of characteristics that enables the switch of the reduction rate of the sun wheel, as well as enables the disengagement and individualized freewheeling.

BACKGROUND OF THE INVENTION

According to the prior art, and as it might be appreciated by the persons skilled in the art, the prior art comprises a series of models of vehicles having tandem or tridem axles, such as the so-called "truck", heavy trucks and the two-axle trucks, or even special vehicles, such as construction and mining machinery, which are generally used for loads transportation.

Aiming to increase the load capacity and provide a better performance during transportation, as well as improve the traction, these models of vehicles may disclose different configurations regarding the layout of its supporting axles and traction. For exemplificative purposes, it is very common for these vehicles to disclose tensile 6×4 configurations and, less often, 8×4 or 10×4, in which out of six, eight or ten contact points, four have traction for providing the vehicle movement. Furthermore, those ones called tridem, in which there are three interconnected drawn axles disclosing six contact points. As it is widely known, these drawn contact points are usually formed by respective tires and wheels of the tandem axles.

The tag axles have at least one reducing system with the main purpose of providing the speed reduction transferred from the Cardan to running axles and, consequently, to the hubs and wheels, increasing the torque. Therefore, it becomes possible to adjust the vehicles so that they can meet different running conditions, but mostly, enable the increase of the wheels' traction, bearing in mind that depending on the conditions and on the type of transportation, it is aimed to obtain the increase of the traction and, thus, the movement speed of the vehicle is committed through these reduction systems.

As it is of the knowledge of the persons skilled in the art, said reduction systems are installed in the axle differential, wherein the reduction is given by the reduction relation between the pinion and the ring of the differential. Additional reduction systems may also be predicted in the axle wheel hubs, by using a well known sun-planetary system. The wheel hub models having reduction systems known in the prior art have a configuration in which it is not possible to change the reduction relation, i.e., regardless whether the vehicle is loaded or not, the reduction system will remain triggered, which may affect the fuel consumption.

Systems for enabling the traction attachment/detachment of an axle are also known in the prior art, such as disclosed in document PCT/BR2016/050182, incorporated hereto for reference purposes. In this sense, when the vehicle is half-loaded, it may be desirable to disengage one of the drawn axles and change from a 6×4 configuration to a 6×2 one, at the same time in which the axle is not lifted. Thus, it is desirable that the wheel cubs also be disengaged form the semi-drafts, in order to avoid the inertia and losses with the axle components and, therefore, also bring savings in terms of fuel.

On the other hand, it would also be desirable that the axle hub enabled selecting the reduction ration, i.e., that it disclosed a variable reduction range, in order to improve the vehicle's performance depending on the type of use such as, for example, totally loaded, half-loaded, or empty.

The invention aims to achieve these objectives, amongst others.

SUMMARY OF THE INVENTION

Concerning the previously disclosed information, it is one of the objectives of the present invention to provide a wheel hub for an assembly of tandem or tridem axles, which comprises the technical and constructive aspects capable of solving, or at least reducing, the inconveniences and restrictions observed in the prior art, as previously described.

More particularly, it is one of the objectives of the present invention to provide a wheel hub for an assembly of tandem axles that enables obtaining an adjust of the speed reduction of the wheels by selecting the most appropriate reduction ratio according to the transported load and the land through where the vehicle moves.

It is also an objective of the present invention to provide a wheel hub that enables to disengage and free the wheel traction, especially in the situations in which the vehicle is moving empty or half-loaded, obtaining a substantial reduction in the resistance of the vehicle's running and, therefore, bring considerable savings in fuel consumption and in the wear and tear of the parts.

Therefore, regarding the previously disclosed information, and aiming to achieve the objectives and the mentioned technical effects, amongst others, the present invention relates to a wheel hub for tandem axles, which comprises a housing within which it is accommodated a reduction system formed by conical sun and planetary gears accommodated within a supporting structure, wherein the sun gears are mounted in a yoke that is attached to the supporting structure and the conical planetary gears are attached, respectively, in the housing of the differential in a fixed way and in the end of the semi-draft having free rotation.

According to the present invention, said wheel hub comprises, further, a connection sleeve that is mounted in the end of the semi-draft having concentric mobility in relation to one of the said conical planetary gears through an actuator system mounted in the end of the supporting structure. Said connection sleeve is comprised, further, by a body having a surface with double engagement toothing in order to provide the proper engagement with the toothing predicted in said yoke and in said conical planetary gear.

According to possible embodiments of the present invention, the actuator system is a hydraulic, pneumatic, electric, electronic, magnetic, or even a combination of these technologies. For exemplificative purposes, this actuator system is a two stage pneumatic rotational valve, wherein the first stage is formed by a central chamber within which it is predicted a piston for support of said connection sleeve, and the second stage is constituted of a peripheral chamber having a ring piston provided with an opening that interacts with the flange predicted in the structural body of said connection sleeve.

Furthermore, according to another possible embodiment of the present invention, said two stage actuator system is a pneumatic rotation valve associated with the auto-calibration system of the loads vehicles, such as the so-called "rodoar" and ""tire pressure gauge".

Additionally, according to an embodiment of the wheel hub, object of the present invention, said actuator system and, more specifically, the connection sleeve comprises a return element, such as a spring, which purpose is to ensure the natural positioning of said sleeve in the regular condition of low speed and high torque.

In addition, according to another embodiment of the present invention the wheel hub comprises a reduction relation that may vary from 1.6:1; 2:1 or 2.7:1.

Said connection sleeve of the wheel hub, object of the present invention, may comprise, according to another possible embodiment, an opening for air passage, aiming to prevent the vacuum build-up or unnecessary pressure.

According to one of the embodiments of the present invention, said yoke with its conical sun gears are mounted in a housing constituted of parts that are screwed, placing said yoke outside the opening center.

Additionally, according to another embodiment of the present invention, the wheel hub is mounted in the semi-shaft-draft through bearings provided with unitized rollers that ensure the proper functioning, and having low risk of causing damages.

Furthermore, according to other embodiments of the present invention, said yoke toothings, of the conical planetary gear and of the connection sleeve, may be openings, notches or any other equivalent means that execute the same locking functions.

Lastly, the present invention also relates to a loads transportation vehicle comprising a mechanical structure formed by a chassis, upon which it is mounted an assembly of tandem axles formed by wheel supporting assemblies placed in the end of the running axles for proper fixation of the wheels with tires, wherein said supporting assemblies comprise wheels' hubs according to the present invention and as it has been previously disclosed. More objectively, said vehicle for transportation may be a so-called "truck", heavy trucks, or two-axle trucks endowed with tandem or tridem axles.

BRIEF DESCRIPTION OF THE DRAWINGS

The features, advantages and technical effects of the present invention, as previously indicated, will be more properly understood by a person skilled in the art from the detailed description that follows, prepared only for exemplificative purposes, and non-restrictive, of its embodiments, and with reference to the accompanying drawings, wherein.

DETAILED DESCRIPTION OF THE INVENTION

The invention is now disclosed according to its particular embodiments making reference to the accompanying drawings of embodiments examples. The reference numbers indicated in the Figs. are repeated throughout the different views in order to indicate identical or similar technical features. Furthermore, the terms possibly used herein such as: above, below, top, bottom, lateral, right, left, front, back and their variations must be interpreted according to the guidance given in FIG. 1.

Figure 1A:
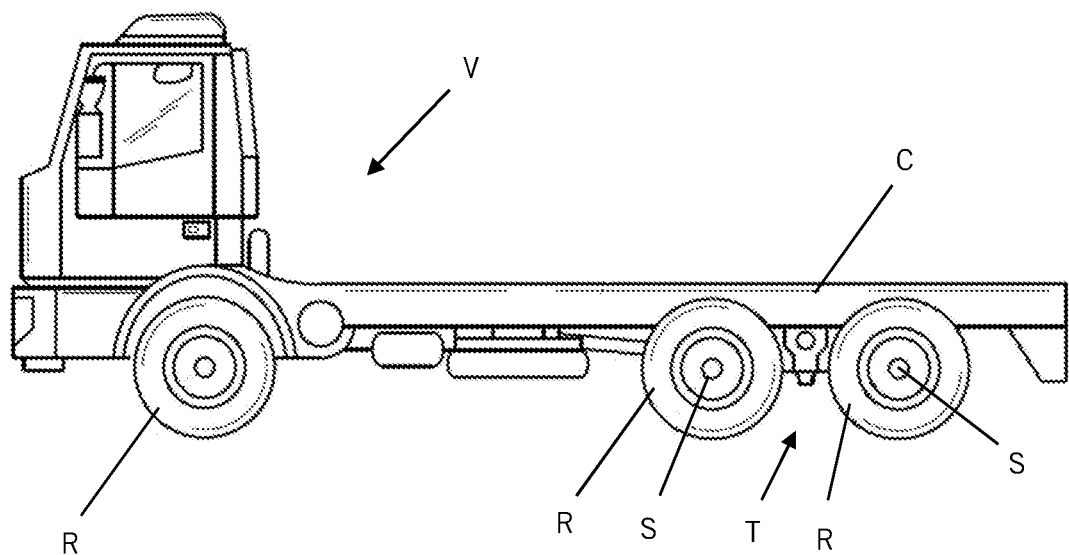
FIG. 1A is a side view of a commercial vehicle having an assembly of tandem axles.
Figure 1B:
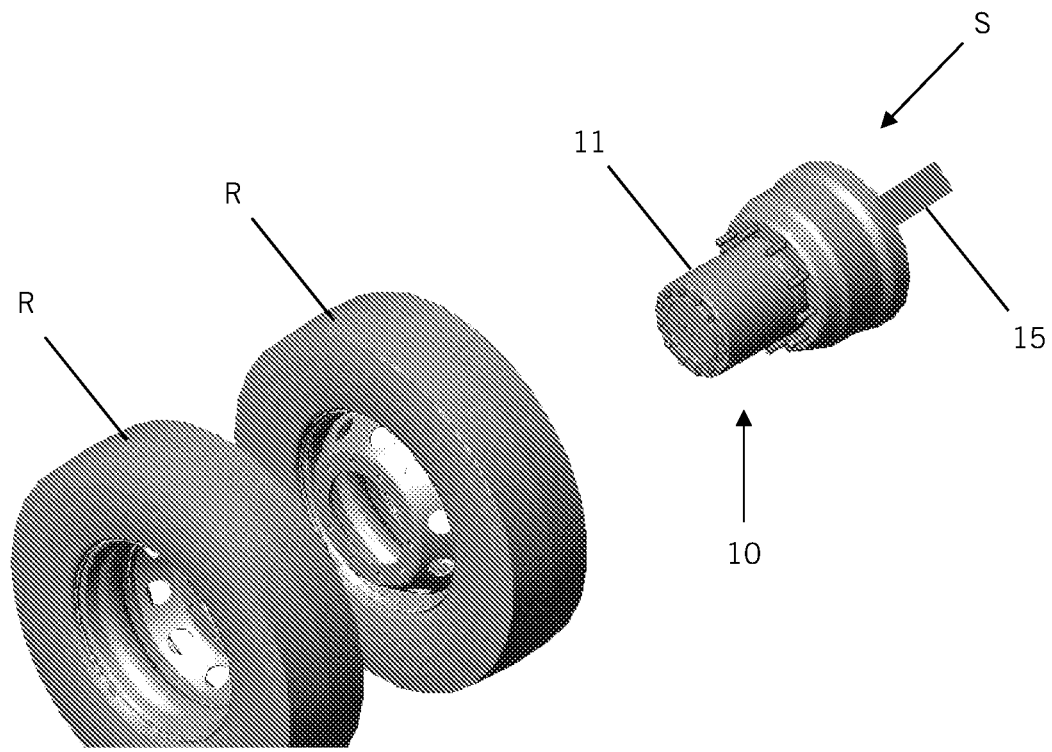
FIG. 1B is a perspective view of the vehicle wheels and of the wheel cub, according to the present invention.

For illustration purposes only and for a better understanding of the present invention, FIG. 1A shows a loads transportation vehicle (V), of a tensile 6×4 type, which chassis (C) supports an assembly of tandem axles (T) formed by at least four wheels supporting assemblies (S), installed in the end of the running axles for proper fixation of the wheels with tires (R). FIG. 1B shows a view of one of the wheels supporting assemblies (S) of the assembly of tandem axles of the vehicle (V), wherein said wheels supporting assembly (S) comprises the wheel hub 10, object of the present invention.

The vehicle (V) also comprises an operator cabin having commands for operating the vehicle, engine, gear, cardan axle, etc., and several other components which details have been intentionally omitted and are not disclosed herein since they are already known in the prior art and the intention is providing a more concise and explanatory description of the invention.

Regarding FIGS. 2 to 5, it is possible to note that the wheel hub 10 for tandem axles (T), according to the present invention, is formed by a housing 11, within which it is mounted a reduction system 13 formed by conical sun gears 13a, 13a' 13a" 13a'" and conical planetary gears 13b, 13b' which are accommodated on a supporting structure 14, 14', such as a closing cover formed by two parts. Said conical sun gears 13a, 13a' 13a" 13a'" may be mounted in rollers and are supported by a yoke 12 that is attached to said supporting structure 14, 14'. The so far described development of a reduction system mounted in a wheel hub is very common in the prior art.

The semi-draft 15, coming from the differential, surpasses the reduction assembly 13, wherein one of the conical planetary gears 13b' is mounted close and concentrically to the end of the semi-draft 15, and is free to rotate around a connection sleeve 17, as it will be clearer hereinafter, whilst the other conical planetary gear 13b is attached and inserted in the wheel hub, i.e., it cannot freely rotate and necessary has the same speed as the hub and, consequently, of the housing 11.

In the end of said semi-draft 15 a connection sleeve 17 is mounted, and it may concentrically move in relation to said conical planetary gear 13b' and to the semi-draft 15, and longitudinally upon the end of the semi-draft 15, according to the actuating state of an actuator system 18 predicted in the end 19 of hub 10. Sleeve 17 is mounted in a supportive way to the semi-draft and, thus, it may comprise internal openings (not shown) that cooperate with openings (15a) predicted in the external diameter of the end of the semi-draft 15. Therefore, the connection sleeve 17 rotates at the same rotation speed as the semi-draft 15.

The body of said connection sleeve 17 comprises a surface having one or more toothings (or openings, notches or any other equivalent means) of double connection, which toothing 17a discloses a configuration corresponding to toothing 12a predicted in said yoke 12, which body was properly worked in such a way to provide the adequate connection to sleeve 17, and the toothing (17b) comprises a configuration corresponding to the toothing 13c of said conical planetary gear 13b' which was also properly worked in order to provide a connection to sleeve 17. The sleeve also comprises a flange 17c for cooperating with the actuating system, as it will be clearer hereinafter upon explanation of the invention's functioning.

Said actuator system 18 is a two stage system, wherein the first stage is responsible for providing the displacement of the connection sleeve 17 in order to obtain the disengagement of said conical planetary gear 13b', disengaging the toothings 13c e 17b, and then obtaining the proper engagement in yoke 12 through the respective toothings 12a and 17a. The second stage, on the other hand, is responsible for providing the partial movement of said connection sleeve 17, placing it in an intermediate position between the conical planetary gear 13b' and the yoke 12, in order to, thus, free the vehicle's wheel traction.

As is might be appreciated by the persons skilled in the art, when the conical planetary gear 13b' is active, i.e., the actuator system 18 is in its natural state and the connection sleeve 17 is properly engaged in said conical planetary gear 13b', the reduction relation of the wheel hub system 10, object of the present invention, is activated, and the transmission relation may vary, as being a relation 1.6:1; 2:1 or 2.7:1, depending on the relations between the conical sun gears 13a, 13a' 13a" 13a''' and planetary gears 13b, 13b' of the reduction system 13.

Furthermore, according to an embodiment of the invention, said connection sleeve 17 comprises an opening (24) for air and hydraulic fluid passage, such as a lubricant that may be present, aiming to avoid the pressure or vacuum and lock the sleeve in a determined position, bearing in mind that the oil that circulates the hub with the reduction system 13 may be the same oil of the differential coming from the differential housing 16.

Figure 2:
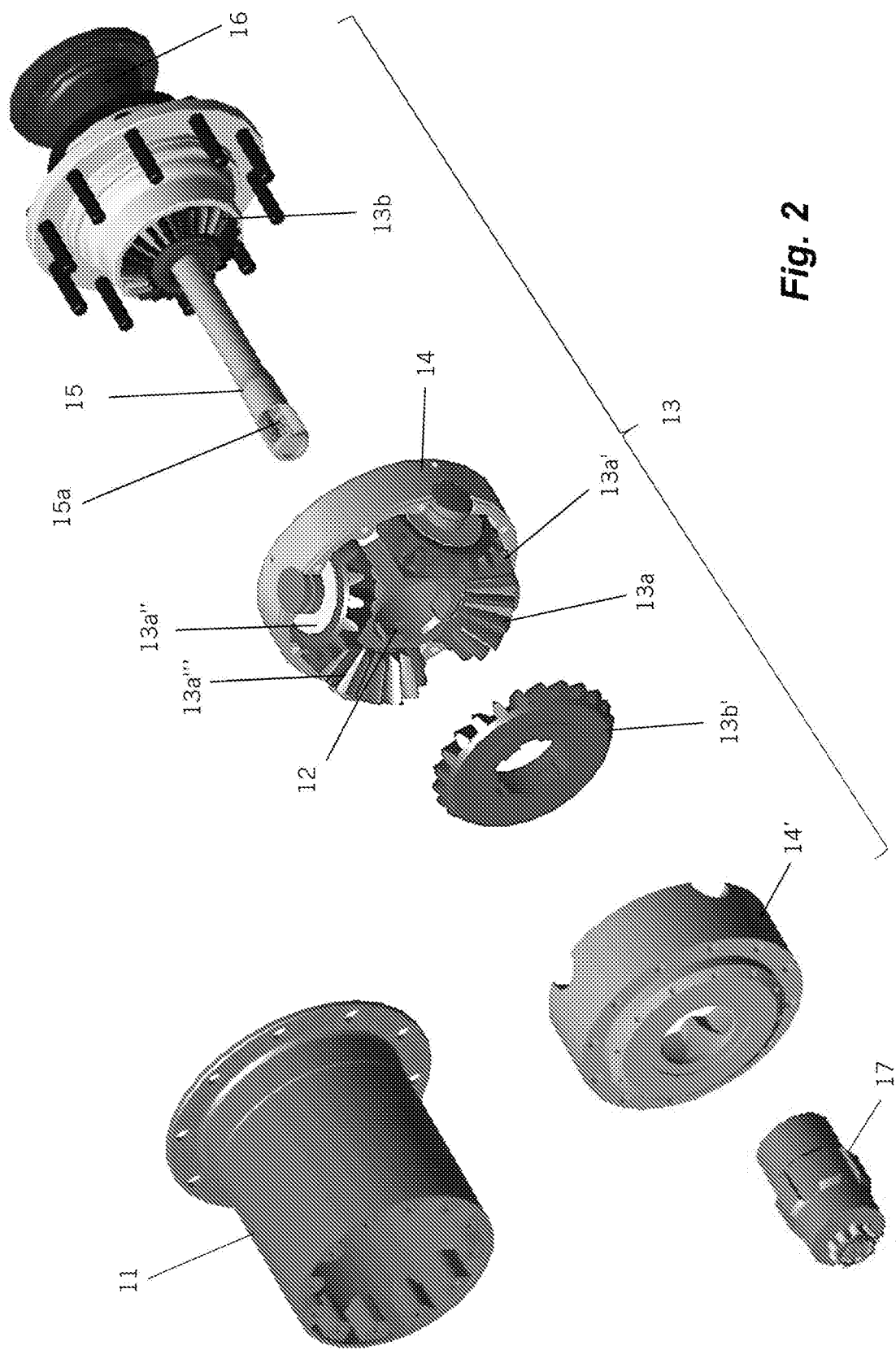
FIG. 2 is an exploded perspective view of the wheel hub according to the present invention.

As shown in FIG. 2, the reduction system 13 and, in particular, the yoke 12 with its sun gears 13a, 13a' 13a" 13a''', are mounted in a housing constituted of two parts 14, 14' that are screwed and place the yoke outside the opening center aiming to avoid any risk of the reduction system to fold.

Considering that the wheel hub for tandem axles, object of the present invention, comprises a connection sleeve 17 that is sliding, preferably it should be mounted attached to the semi-draft 15 having bearings provided with unitized rollers 20, since, in such conditions, the assembly may not disclose any clearances, for it would severely affect the displacement of said connection sleeve 17.

For exemplificative purposes, and as it may be noted in the accompanying drawings, said connection sleeve 17 displaces longitudinally on the end of the semi-draft 15 between the rest position, with the reduction triggered; active, without reduction; and disengaged.

Figure 3:
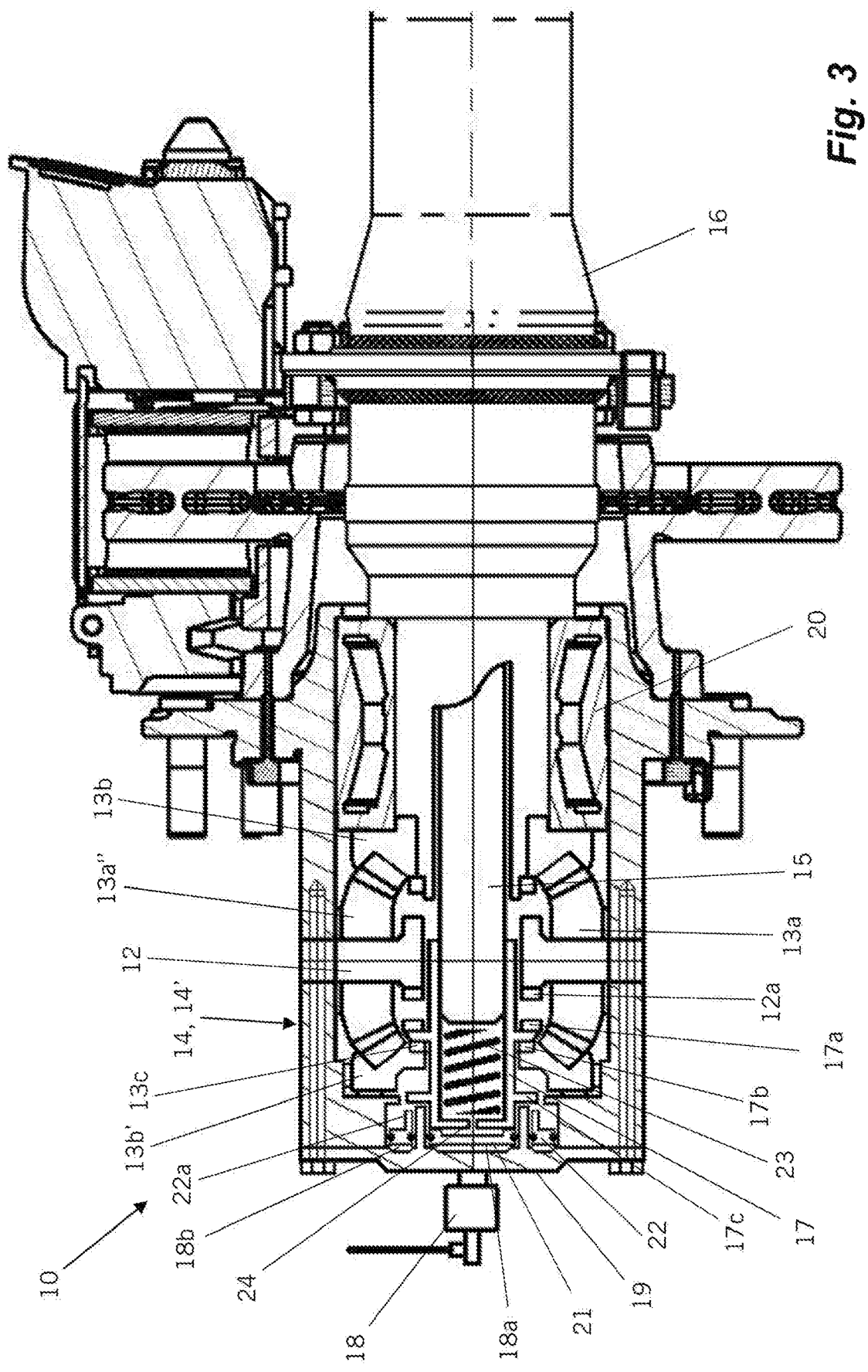
FIG. 3 is a sectional side view of the wheel hub, object of the present invention, in its natural state having the reduction activated.

More particularly, as it is shown in FIG. 3, in the rest position, the two stage actuator system 18 is deactivated and, in such condition, said connection sleeve 17 is in the inactive state and, therefore, its toothing 17b is properly attached to toothing 13c of the conical planetary gear 13b'. Thus, the power of the semi-draft 15 is transmitted towards sleeve 17 and to the planetary-sun system, and the rotation will be reduced by the conical sun gears 13a, 13a' 13a" 13a''' and planetary gears 13b, 13b', in a way that it achieves the torque increase in the wheel.

Figure 4:
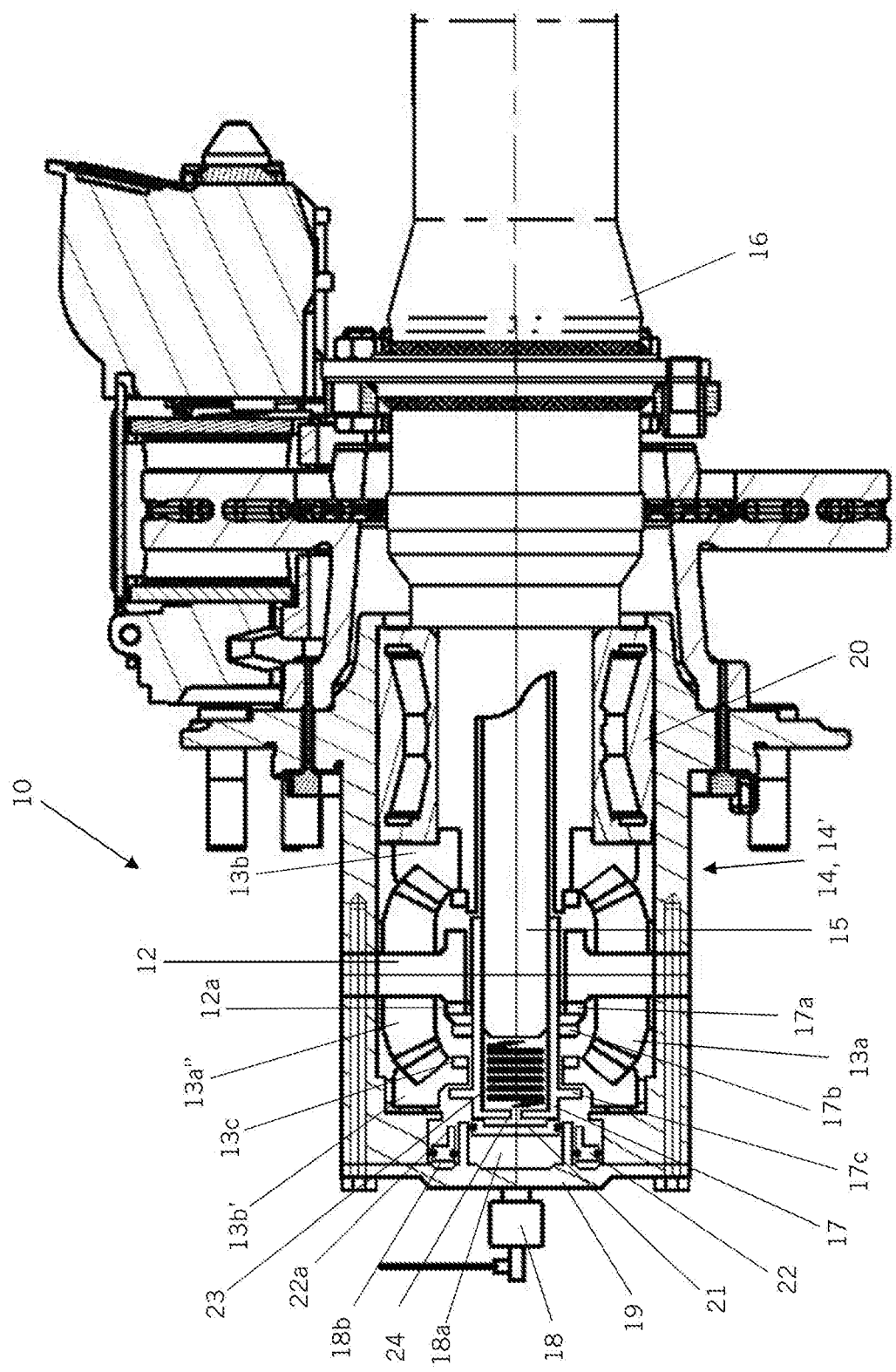
FIG. 4 is a sectional side view similar to the one illustrated in FIG. 3, having the wheel hub in the activated state, without the reduction activated.

FIG. 4 shows the wheel hub 10 in the condition in which the actuator system 18 is activated in the condition established as first stage, i.e., totally displaced in the direction of the semi-draft 15. In such condition, on one side the toothing 17b of the connection sleeve 17 is engaged to toothing 13c of the conical planetary gear 13b' and, on the other side, toothing 17a of the connection sleeve 17 is engaged to toothing 12a of the yoke 12. Thus, the power of the semi-draft 15 is directly transferred to the yoke and, consequently, to the hub and to the housing 11, obtaining, therefore, no speed reduction and the torque reduction in the wheel.

Figure 5:
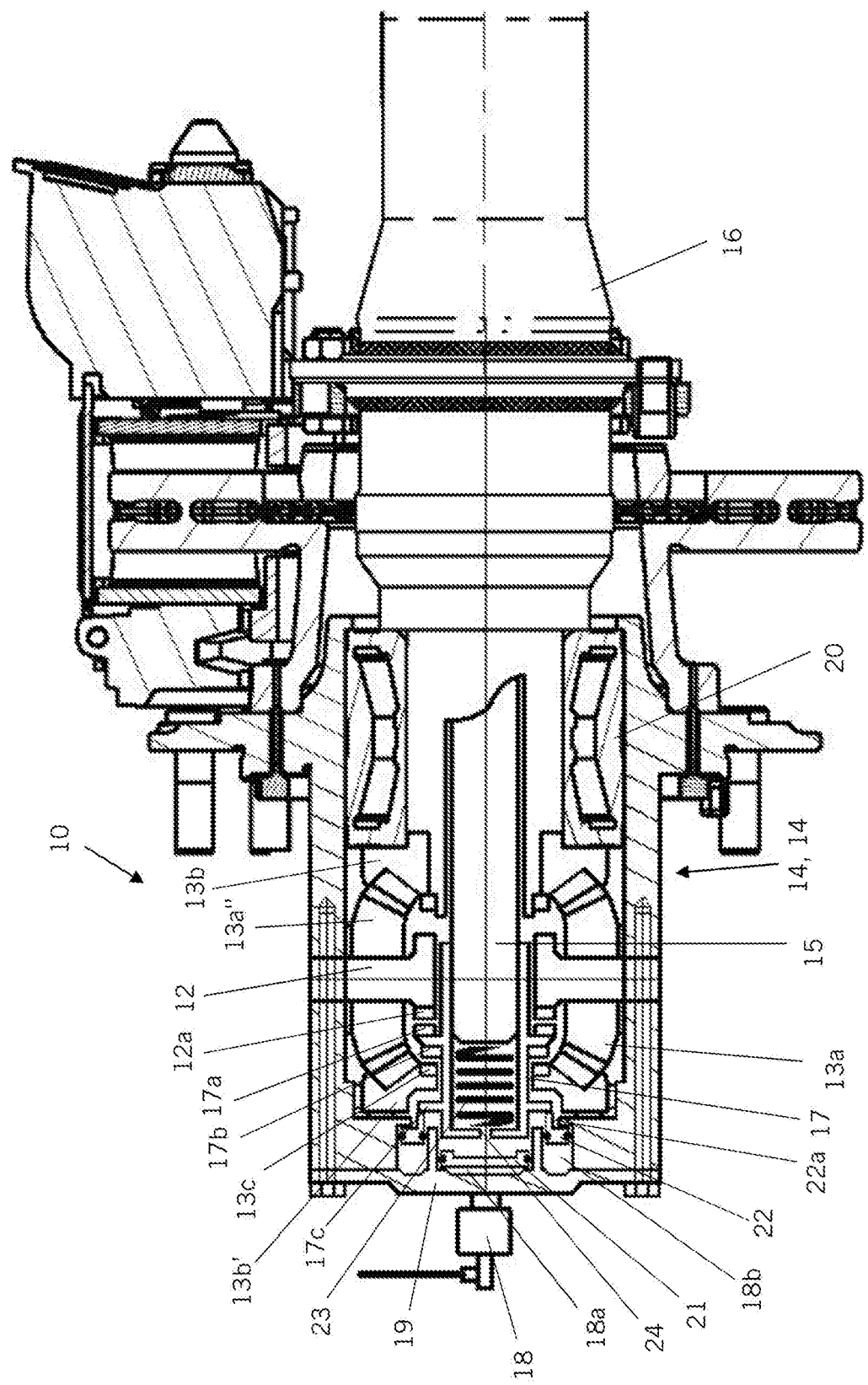
FIG. 5 is a sectional side view similar to the ones illustrated in FIGS. 3 and 4, having the wheel hub in the disengaged state, i.e., without traction transmission.

FIG. 5 shows the wheel hub 10, according to the present invention, in the disparagement condition and free of traction in the vehicle (V) wheel. This condition, for exemplificative purposes only, is very useful for the cases in which the traction disengagement for turning off the semi-drafts occur, for example, in the 6×2 configuration, wherein the driver deactivates the cardan axle for the second axle and deactivates the wheels' traction to release them from any friction or wear and tear. An example of this constructability and applicability may be found in the international patent application PCT/BR2016/050182, which is incorporated herein by reference.

Thus, as shown in FIG. 5, the wheel hub 10, object of the present invention, is in the disengagement condition and, for this purpose, the second stage of the actuator system 18 is activated, in a way that it disposes the said connection sleeve 17 in the intermediate position, in which its toothing 17a is disengaged from toothing 12a of the yoke and, at the same time, the toothing 17b is also disengaged from toothing 13c of the conical planetary gear 13c.

According to one embodiment of the invention, the actuator system 18 of the wheel hub 10 may be activated hydraulically, pneumatically, electrically, electronically and/or magnetically, as long as it is able to provide the two stage phased displacement of said connection sleeve 17 and, therefore, provide its connection with the conical planetary gear 13b' and the yoke 12.

Furthermore, according to one embodiment of the present invention, the actuator system 18 is a two stage pneumatic rotational valve, wherein the first stage is formed by a central chamber 18a that moves a piston 21 that is contact with the base of said connection sleeve 17, and the second stage is constituted by a peripheral chamber 18b having a ring piston 22 provided with an opening 22a responsible for interacting with a flange 17c predicted in the structural body of said connection sleeve 17.

According to a possible embodiment of the present invention, in the case of said two stage pneumatic rotational valve, it is possible to adapt it for being triggered by the existing auto-calibration systems in transportation vehicles, the so-called "rodoar" and ""tire pressure gauge", which are able to provide the calibration and adjustments of the tires automatically, including with the vehicle in movement.

Additionally, aiming to ensure the return of said connection sleeve 17 to its rest position, i.e., in the high torque reduction state, said connection sleeve 17 has a return mean 23, such as a spring, that provides the movement of sleeve 17 to the position in which its toothing 17b is properly attached to toothing 13c of the conical planetary gear 13b'.

As it is possible to note, the wheel hub 10, according to the present invention, comprises technical and constructive features that turns it into a practical and of easy installation solution for vehicles having assemblies of tandem axles (T). This is because its adaptation slightly affects the structure of these axles, since its installation basically occur in the end of the semi-drafts, dispensing relevant structural modifications in the rest of the components of the assembly of tandem axles (T).

Furthermore, the present invention also relates to a vehicle (V), such as a loads transportation vehicle, comprising a mechanical structure formed by a chassis (C), within which an assembly of tandem axles (T) is disclosed, such as the tandem or tridem type, constituted by assemblies of wheels supporting (S) installed in the end of the running axles for proper fixation of the wheels with tires (R), wherein said assemblies of wheels supporting (S) of the assembly of tandem axles of vehicle (V) comprise wheel hubs 10, such as defined by the present invention.

Lastly, upon all that has been previously disclosed, it is important to make it clear that the present description aims to disclose and define, in an exemplificative way, possible embodiments of the wheel hub for assemblies of tandem axles used in loads transportation vehicles. Therefore, as it might be understood by the persons skilled in the art, several modifications and constructive combinations of equivalent elements are possible without, therefore, escaping from the protection scope defined by the accompanying claims.

The invention claimed is:

1. A wheel hub for tandem axles, comprising:
a housing within which a reduction system is accommodated and formed by conical sun gears and conical planetary gears accommodated in a supporting structure wherein:
the sun gears are mounted in a yoke that is attached to said supporting structure;
the conical planetary gears are attached, respectively, to a differential housing in a fixed way and to an end of a semi-draft having free rotation; and
a connection sleeve is mounted in the end of the semi-draft having concentric mobility in relation to said conical planetary gear through an actuator system placed in an end of the supporting structure, wherein said connection sleeve is formed by a body having a surface with double connection toothing disclosing a configuration corresponding to toothing of the yoke, and the toothing having a configuration corresponding to toothing of said conical planetary gear, the actuator system being a two stage pneumatic rotational valve, wherein the first stage is formed by a central chamber within which there is a piston which is engaged with said connection sleeve, and the second stage is constituted by a peripheral chamber having a ring piston having an opening that interacts with a flange of the structural body of said connection sleeve.

2. The wheel hub for tandem axles of claim 1, wherein said connection sleeve comprises a return element.

3. The wheel hub for tandem axles of claim 1, wherein the wheel hub has a reduction relation that varies from 1.6:1, 2:1 or 2.7:1.

4. The wheel hub for tandem axles of claim 1, wherein said connection sleeve has an opening for air passage.

5. The wheel hub for tandem axles of claim 1, wherein said yoke having its conical sun gears mounted in a housing constituted by the supporting structure that are screwed thereto, positioning said yoke outside an opening center.

6. The wheel hub for tandem axles of claim 1, wherein the wheel hub is mounted attached to the semi-draft through bearings provided with unitized rollers.

7. The wheel hub for tandem axles of claim 1, wherein said toothings are openings or notches.

8. A vehicle, comprising a mechanical structure formed by a chassis, within which an assembly of tandem axles is disclosed, formed by supporting assemblies of wheels installed to an end of the axles for proper fixation of the wheels with tires, wherein said supporting assemblies are wheels hubs according to claim 1.

9. The vehicle of claim 8, wherein the vehicle is a truck, a heavy truck or a two-axle truck, having tandem or tridem axles.

10. The wheel hub for tandem axles of claim 2, wherein the return element is a spring.

11. A wheel hub for tandem axles, comprising:
a housing within which a reduction system is accommodated and formed by conical sun gears and conical planetary gears accommodated in a supporting structure wherein:
the sun gears are mounted in a yoke that is attached to said supporting structure;
the conical planetary gears are attached, respectively, to a differential housing in a fixed way and to an end of a semi-draft having free rotation; and
a connection sleeve is mounted in the end of the semi-draft having concentric mobility in relation to said conical planetary gear through an actuator system placed in an end of the supporting structure, wherein said connection sleeve is formed by a body having a surface with double connection toothing disclosing a configuration corresponding to toothing of the yoke, and the toothing having a configuration corresponding to toothing of said conical planetary gear, said two stage actuator system is a pneumatic rotational valve associated with a vehicle.

* * * * *